Figure 1:
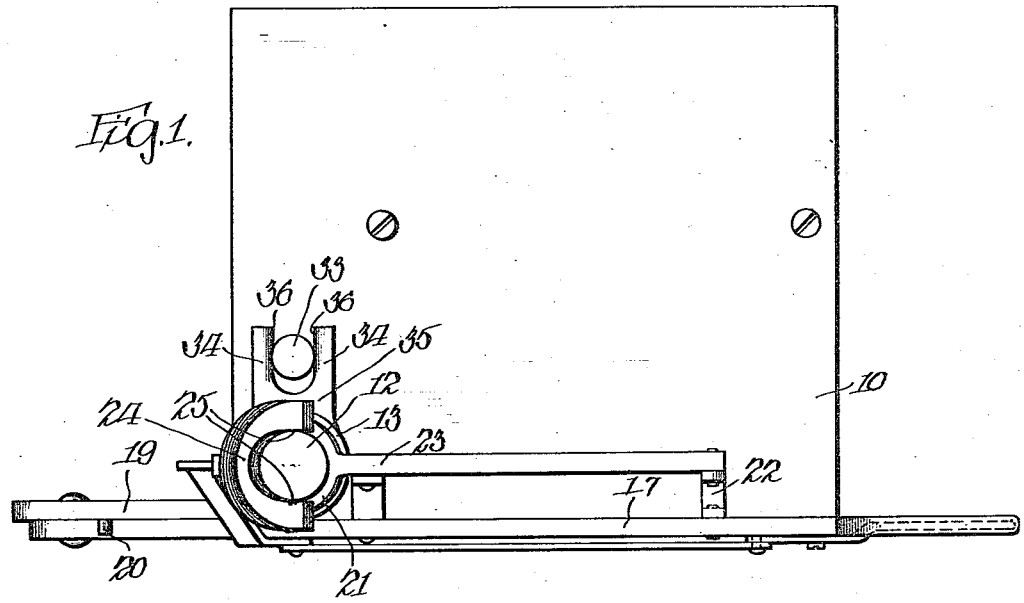

C. F. M. VAN BERKEL.
GRIP FOR SLICING MACHINES.
APPLICATION FILED JUNE 18, 1917.

1,272,580.

Patented July 16, 1918.

Witness:
Leo J. Dukeas

Inventor:
Cornelis F. M. van Berkel
Brown Nissen & Sprinkle
Attys.

UNITED STATES PATENT OFFICE.

CORNELIS F. M. VAN BERKEL, OF LAPORTE, INDIANA, ASSIGNOR TO U. S. SLICING MACHINE COMPANY, OF LAPORTE, INDIANA, A CORPORATION OF INDIANA.

GRIP FOR SLICING-MACHINES.

1,272,580.

Specification of Letters Patent. Patented July 16, 1918.

Application filed June 18, 1917. Serial No. 175,283.

*To all whom it may concern:*

Be it known that I, CORNELIS F. M. VAN BERKEL, a subject of the Queen of the Netherlands, residing at Laporte, in the county of Laporte and State of Indiana, have invented certain new and useful Improvements in Grips for Slicing-Machines, of which the following is a specification.

This invention relates to a device for use in connection with slicing machines of any well known type for the purpose of holding the material while it is being sliced, and has for its object the provision of such a device which shall be of improved construction and more efficient and convenient in operation than similar devices previously known.

The invention is exemplified in the combination and arrangement of parts shown in the accompanying drawing and described in the following specification, and it is more particularly pointed out in the appended claims.

In the drawings—

Figure 2:
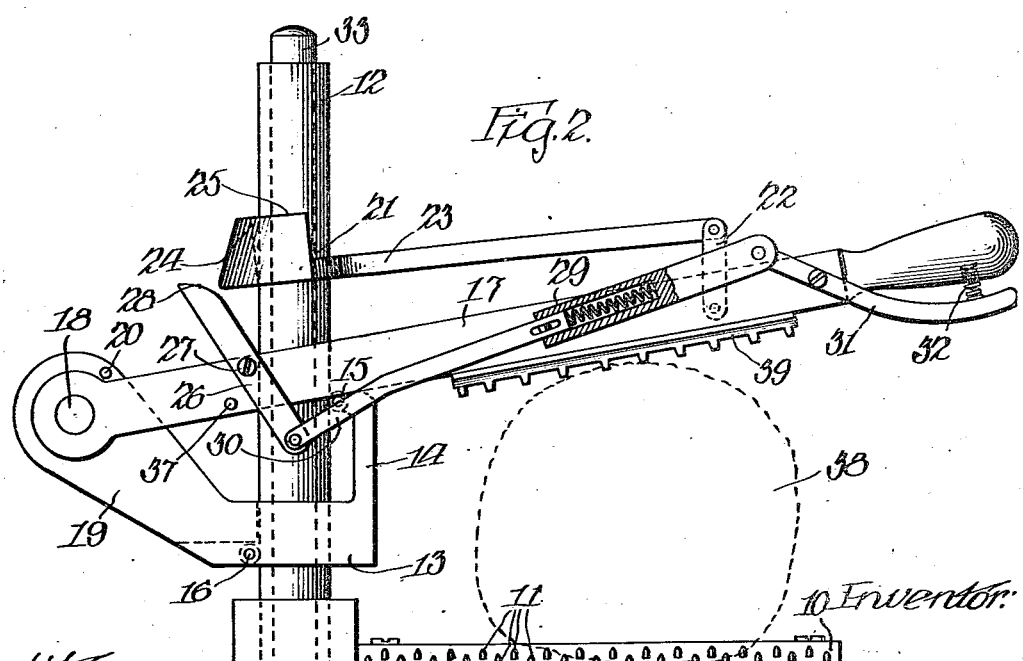

Figure 1 is a top plan view of a slicing machine meat plate showing one embodiment of the present invention connected therewith; and Fig. 2 is an elevational view of the device shown in Fig. 1.

A plate such as is ordinarily used in connection with machines of this character for supporting the meat while it is being sliced is shown at 10 in the drawing. This plate is provided at its front end with a series of teeth 11 which tend to hold the meat in position upon the plate. Projecting upwardly from one corner of the plate adjacent its front edge is a supporting bar or standard 12 which carries a sliding clutch loop or sleeve 13. The sleeve 13 is provided on one side with an upwardly projecting arm 14 which carries a roller 15 at its upper end arranged to bear against the surface of the standard 12. A similar roller 16 is journaled on the sleeve 13 at the side opposite the projection 14 and at the lower edge of the sleeve. The rollers 15 and 16 prevent the sleeve from tilting in a counter-clockwise direction, as viewed in Fig. 2, but leave the sleeve free to tilt in the opposite direction to cause it to bind upon the post and prevent downward movement longitudinally thereof. A clamping bar 17 is pivotally carried at 18 on a projection 19 which is formed integral with the sleeve 13 and extends laterally from the sleeve in a direction opposite the plate 10. A pin 20 is mounted on the projection 19 in position to limit the upward movement of the clamping bar 17 about its pivot. A second clutch ring 21 surrounds the standard 12 above the sleeve 13 and is connected with the clamping bar 17 by means of a link 22 and an arm 23 formed integral with the ring 21. The clutch ring 21 on the side opposite the arm 23 projects upwardly to form a bearing portion 24 which contacts with the lateral faces of the post 12 at the points 25. This arrangement permits the clutch ring 21 to grip the post when the end of the extension 23 is moved upwardly, but prevents gripping of the ring upon the post when the end of the extension is moved downwardly. A lever 26 is pivoted at 27 to the clutch bar 17 and is provided with a cam surface 28 arranged to bear against the lower edge of the ring 21 to move the ring upwardly and thus release its hold upon the post 12 when the ring is in gripping position. A link 30 is pivotally connected to the lower end of the lever 26 and has its opposite end pivoted to a hand lever 31 mounted on the clamping bar 17 near the end of the bar opposite the post 12. The bar 31 is provided with a telescoping connection 29 having a spring for holding it in its extended position. A coil spring 32 is interposed between the lever 31 and the end of the clamping bar 17 to hold the cam surface 28 normally out of contact with the clutch ring 21. The clutch sleeve 13 may be prevented from rotation upon the post 12 in any well known manner. In the drawing a supplemental post 33 is shown positioned adjacent the post 12 and engages with bifurcations 34 on an extension 35 secured to the clutch sleeve 13. The inner surfaces of the bifurcations 34 are rounded, as shown at 36, to permit tilting movement of the sleeve without interfering with the bearing of the bifurcations upon the post. It is apparent that the same object could be accomplished by the use of pins projecting in the upright 12 arranged in a plane passing through the axis of the post at right angles to the clamping bar 17. A pin 37 projects from the face of the clamping bar 17 to limit the movement of the lever 26, and a gripping member 39 is secured to the lower surface of the bar 17 in position to contact with the material 38 to hold the material in position upon the plate 10.

The operation of the device is as follows: The gripping bar is raised to a sufficient height above the table 10 to permit insertion of the material 38, by lifting upwardly on the handle portion of the bar 17. During this lifting operation the hand lever 31 is compressed to raise the clutch ring 21 into a position where it will slide freely along the post 12 during the upward movement of the clamping device. The upward pressure on the bar 17 causes the bar to engage the pin 20 and thus bring the rollers 15 and 16 into contact with the post 12. In this position the sleeve 13 slides freely along the post 12 during the upward movement of the grip. Since the clamp is supported by a single standard at one corner of the plate 10, the entire remaining periphery of the plate is unobstructed, so that there is nothing to hinder the movement of the meat into proper position to be clamped. When the meat has been so placed, the operator moves the end of the clamping bar downwardly until the contact member 39 engages the upper surface of the meat. During this movement both clutch rings slide freely in a downward direction along the post 12, since the downward movement of the arms connected with the bar 17 is in a direction tending to tilt the clutch rings out of gripping relation with the post. As soon as the contact member 39 engages the meat, further downward pressure on the bar 17 exerts a force in an upward direction on the pivot 18 and thus tilts the ring 13 into gripping engagement with the post 12 and prevents upward movement of the ring along the post. The clamping bar may be pressed firmly into engagement with the piece of meat, and as the end of the bar opposite the post 12 moves downwardly the gripping ring 21 will slide downwardly along the post, but will be always held against reverse movement by its clamping action upon the post, and thus the outer end of the bar 17 is held in the position into which it is forced by the downward pressure exerted upon it. When it is desired to again free the meat from the grip, the hand piece 31 is compressed forcing the cam surface 28 into contact with the ring 21 and releasing the gripping action of the ring upon the post. When this has been done, the clamping bar 17 may be again moved upwardly any amount desired. The telescoping joint 29 although not an essential feature to the operation of the device is a convenient one in that it prevents the necessity of accurately gaging the amount of movement of the lever 31 produced by gripping the lever and the handle portion of the bar 17 in the hand. The stop 37 prevents excessive movement of the lever 26 to a position in which it would force the ring 21 to grip the post 12 against upward movement. It will be seen that this construction provides an arrangement by which the clamping bar may be held in engagement with the material to be sliced through a connection with one end of the bar only, leaving the other end entirely free, and yet the bar is freely adjustable and may be controlled from its free end and requires the use of but one hand of the operator for its control. The fact that but a single supporting post is required makes it very easy to place the meat in position upon the plate, since the plate is unobstructed around its entire periphery, except for a single support at one corner.

I claim:

1. A clamp for holding material to be sliced comprising an upright standard, a clamping bar having one end thereof slidably mounted on said standard, said bar being entirely supported from said slidably mounted end thereof thus leaving the other end freely projecting away from said standard, mechanism for holding said bar in different positions of adjustment along said standard, and means adjacent the freely projecting end of said bar for controlling said holding mechanism.

2. A clamp for holding material to be sliced comprising an upright standard, a clamping bar having one end thereof pivotally and slidably mounted on said standard, said bar being entirely supported from said end, thus leaving the other end thereof freely projecting from said standard, mechanism for controlling the sliding and pivotal movement of said bar, and means adjacent the freely projecting end of said bar for controlling said holding mechanism.

3. In combination, a gripping bar for holding material to be sliced, a single supporting post for said bar located adjacent one end thereof and along which said bar is vertically adjustable, means for holding said bar in adjusted positions on said post, and means operable from the opposite end of said bar for controlling said holding means.

4. In combination, a clamping bar for holding material to be sliced, a single supporting post for said bar located adjacent one end thereof, means for holding said bar in adjusted positions relative to said post to permit said bar to clamp material to be sliced, and means operable from the opposite end of said bar to control said holding means to permit movement of said bar in either direction along said post.

5. In combination, a plate for holding material to be sliced, a bar for clamping material in position on said plate, a support for said bar located adjacent one corner of said plate leaving the other portions of the periphery of said plate entirely unobstructed, said bar being connected with said support to move bodily in a vertical direction thereon, means for holding said bar in its various positions of vertical adjustment on said support, and means located adjacent the end of said bar opposite said support for operating said holding means.

6. In combination, a bar for holding material to be sliced having an intermediate clamping portion, an upright post for supporting said bar and connected therewith at one side of said clamping portion, means for holding said bar in adjusted positions along said post to resist the force exerted upon said bar due to a clamping action, and a connection between said holding means and the end of said bar opposite said intermediate clamping portion to permit the control of said holding means from said opposite end.

7. In combination, a bar for holding material to be sliced, an upright post for entirely supporting said bar, a clutch sleeve surrounding said post, a connection between said sleeve and bar arranged to cause said sleeve to grip said post when pressure is exerted upon said bar by a clamping operation, and means for preventing said sleeve from gripping said post to permit adjustment of said bar along said post.

8. In a device for holding material to be sliced, an upright supporting standard, a clutch sleeve mounted on said standard and adjustable longitudinally thereof, a clamping bar pivotally connected with said sleeve at one side of said post, means for preventing said sleeve from gripping said post when downward pressure is exerted by said bar upon said sleeve, and means for holding said sleeve out of gripping position when said clamping bar is held in a given angular position relative thereto and upward pressure is exerted by said bar upon said sleeve.

9. In combination, a plate for holding material to be sliced, an upright supporting standard carried by said plate, a bar having a clamping portion positioned above said plate and having the end thereof on one side of said clamping portion adjustably connected with said upright standard, and means carried at the opposite end of said bar for controlling the connection between said bar and said standard.

10. In combination, an upright supporting standard, a clamping bar, a clutch loop mounted on said standard and connected with said bar for holding said bar against longitudinal movement along said standard, and a second clutch loop mounted on said standard and connected with said bar for holding said bar against angular movement relative to said standard.

11. In a device for holding material to be sliced, an upright supporting standard, a clamping bar associated with said standard, a clutch sleeve for controlling the movement of said bar longitudinally along said standard, and a second clutch sleeve for controlling the movement of said bar angularly relative to said standard.

12. In a device for holding material to be sliced, an upright supporting standard, a bar having an intermediate clamping portion, a clutch sleeve surrounding said standard and pivotally connected with said bar at one side of said clamping portion, a second clutch sleeve surrounding said standard and connected with said bar at the same side of said clamping portion, said clutch sleeves being arranged to hold said bar rigidly in adjusted positions relative to said standard to cause said bar to hold material during a slicing operation, and means carried by said bar at the end thereof opposite said standard for controlling said clutch sleeves to permit adjustments of said bar into its different positions.

In testimony whereof I have signed my name to this specification, on this 16th day of June A. D. 1917.

CORNELIS F. M. van BERKEL.